No. 635,134. Patented Oct. 17, 1899.
A. GREER.
CHECK ROW PLANTER.
(Application filed July 8, 1898.)
(No Model.) 3 Sheets—Sheet 3.
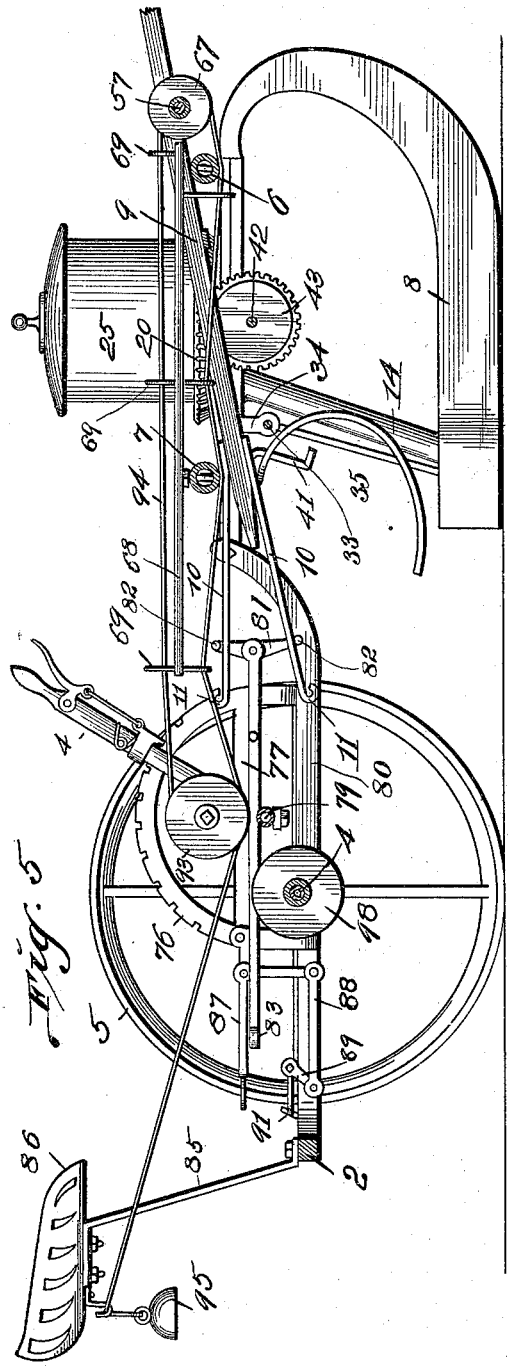
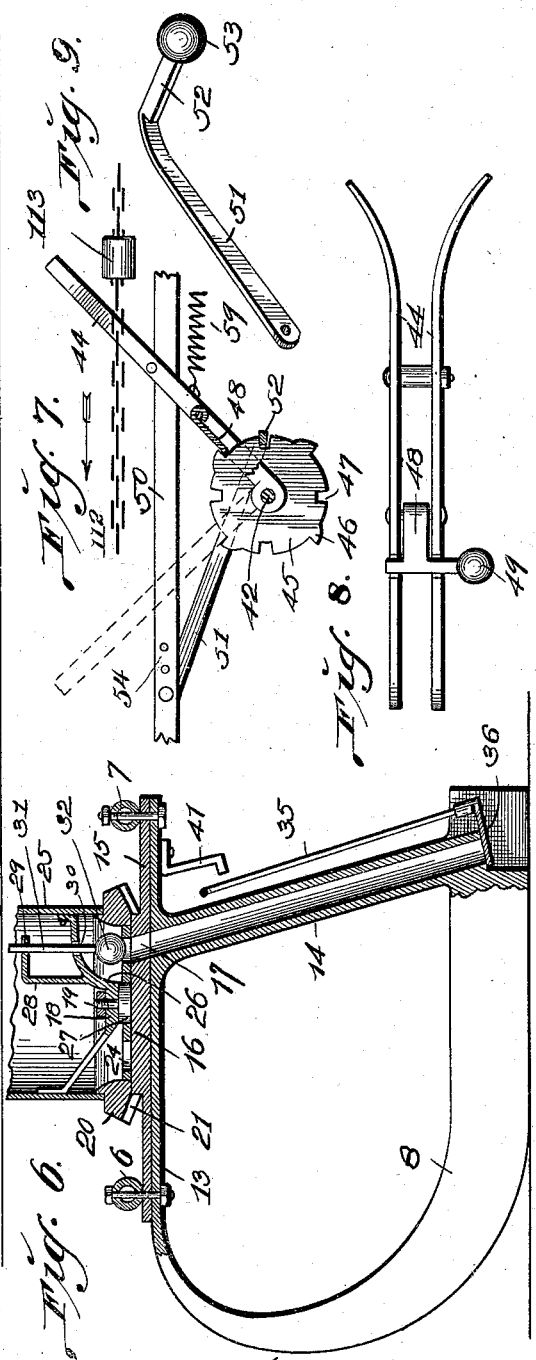
Inventor
Arthur Greer:—
By Higdon & Longan
Atty's.
Attest
N. P. Smith
Maude Griffing

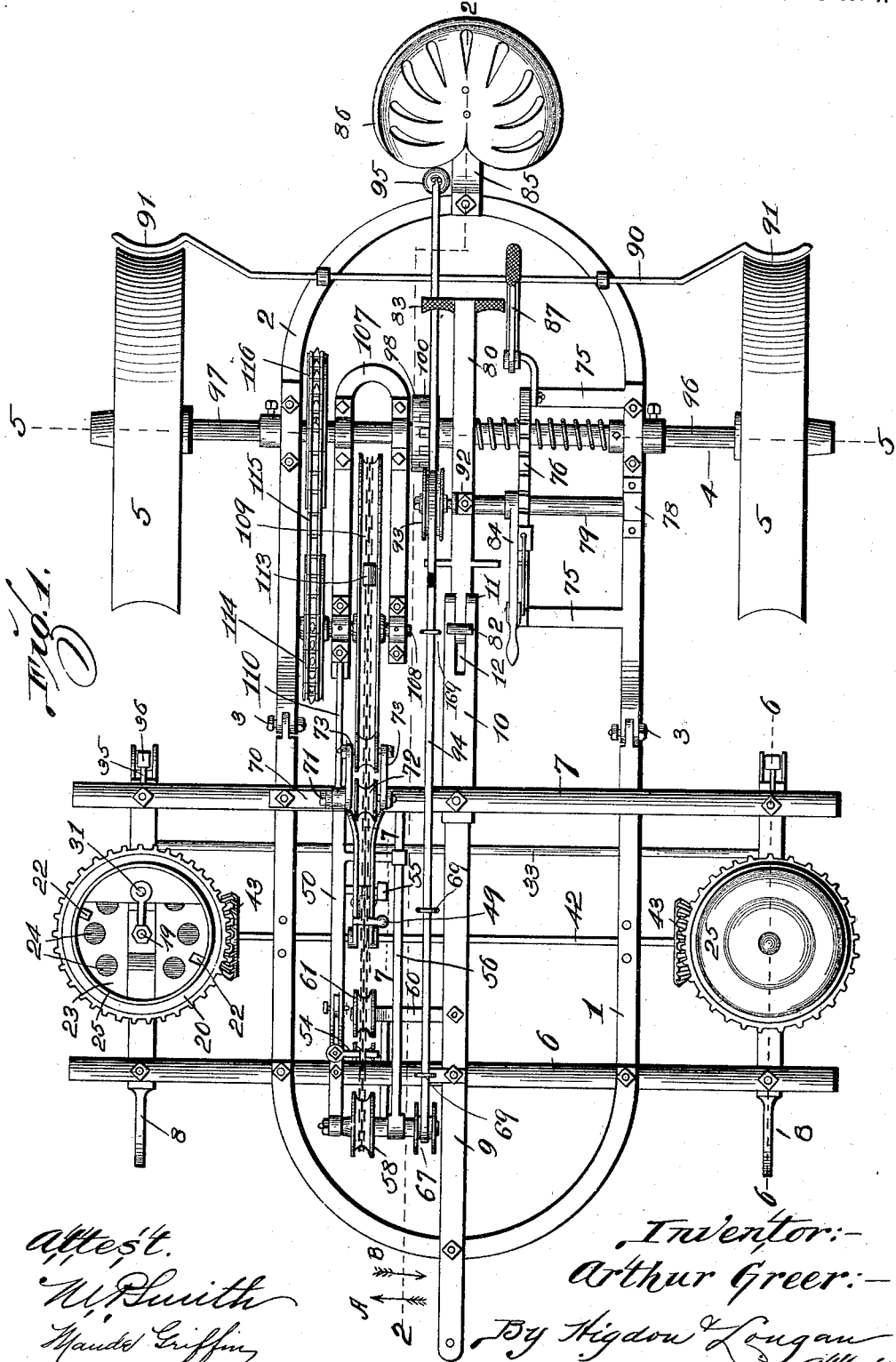

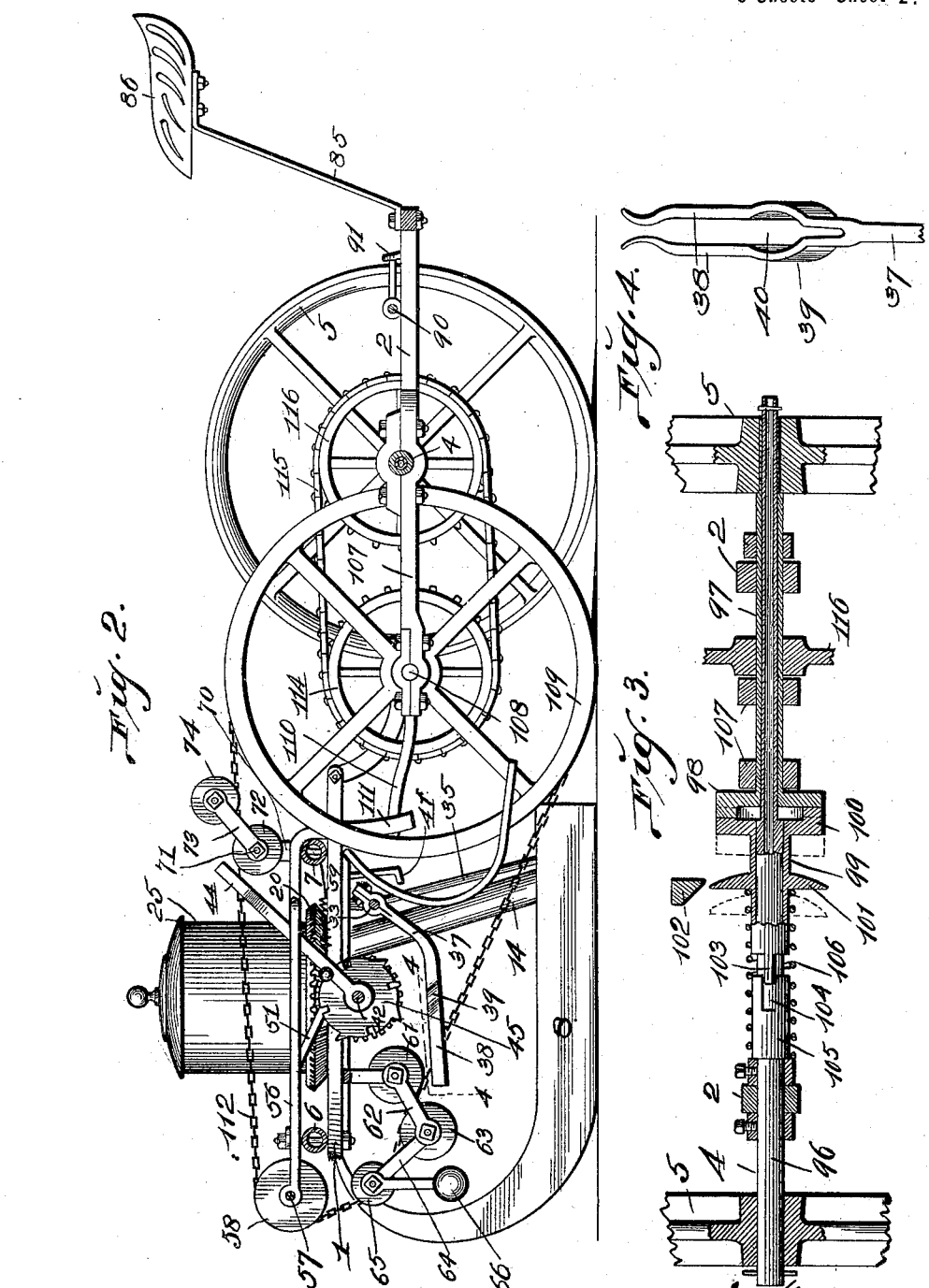

UNITED STATES PATENT OFFICE.

ARTHUR GREER, OF DICK'S MILL, MISSOURI, ASSIGNOR OF ONE-HALF TO WILLIAM F. QUIGLEY, OF TIPTON, MISSOURI.

CHECK-ROW PLANTER.

SPECIFICATION forming part of Letters Patent No. 635,134, dated October 17, 1899.

Application filed July 8, 1898. Serial No. 685,425. (No model.)

*To all whom it may concern:*

Be it known that I, ARTHUR GREER, of the city of Dick's Mill, Cooper county, State of Missouri, have invented certain new and useful Improvements in Check-Rowers, of which the following is a full, clear, and exact description, reference being had to the accompanying drawings, forming a part hereof.

My invention relates to check-rowers; and it consists of the novel construction, combination, and arrangement of parts hereinafter shown, described, and claimed.

Figure 1 is a plan view of a check-rower of my improved construction. Fig. 2 is a longitudinal sectional view taken approximately on the indicated line 2 2 of Fig. 1 and looking in the direction indicated by the arrow A. Fig. 3 is a detail cross-sectional view taken approximately on the line 5 5 of Fig. 1. Fig. 4 is a detail sectional view taken approximately on the line 4 4 of Fig. 2 and showing the lever that operates the gates to allow the seed to drop from the plows of the planter into the ground. Fig. 5 is a longitudinal sectional view of the check-rower, taken on the indicated line 2 2 of Fig. 1 and looking in the direction indicated by the arrow B. Fig. 6 is an enlarged detail sectional view taken approximately on the line 6 6 of Fig. 1. Fig. 7 is an enlarged detail view taken approximately on the line 7 7 of Fig. 1. Fig. 8 is an enlarged plan view of the tripping-arms seen in Fig. 7. Fig. 9 is a view in perspective of a gravity-pawl of which I make use in carrying out my invention.

In the construction of my improved check-rower I make use of a runner-frame 1 and a wheel-frame 2, said frames being U-shaped and arranged in horizontal positions, the runner-frame in front of the wheel-frame and the meeting ends of said frames being joined by bolts 3 to form a hinged joint between said frames. The runner-frame 1 lies in a plane above that occupied by the wheel-frame 2, the forward ends of said wheel-frame 2 being curved upwardly in order to join with the rear ends of the runner-frame.

A tubular shaft or axle 4, which will be hereinafter described in detail, is transversely arranged in suitable bearings at the rear end of the wheel-frame, upon the outer ends of which tubular shaft or axle are arranged traction-wheels 5. A pair of parallel tubular cross-bars 6 and 7 is arranged transversely upon the runner-frame, the bar 6 being near the forward end thereof and the bar 7 adjacent the rear end of the frame, and carried by the outer ends of these bars 6 and 7 are the runners 8, the same being immediately in front of and in alinement with the traction-wheels 5. Extending longitudinally through the center of the runner-frame is a bar 9, the forward end of which terminates a short distance in front of said runner-frame, and to said forward end of the bar is attached the doubletree (not shown) that forms a connection between the check-rower and the draft-animals. This bar 9 is bolted to the transverse cross-bars 6 and 7, and to the rear end of said bar 9 is bolted a pair of strong spring-plates 10, the same extending rearwardly from the top and bottom sides of said bar 9, the extreme rear ends of said spring-plates being provided with rolled ends or lugs 11 and there being longitudinally-extending slots 12 formed in the rear ends of said plates. The runners 8 are of the usual form and are provided at their tops with the longitudinally-extending bars 13, the tubular seed-chutes 14 connecting said bars 13 with the rear ends of the runners 8. Rigidly located upon the tops of the bars 13 are the plates 15, with each of which is formed integral an upwardly-projecting circular disk 16, in which is formed an aperture 17, which coincides with the passage through the tubular seed-chute. A circular lug 18 is formed integral with the center of the disk or plate 16, and projecting upwardly from the center of the lug 18 is a screw-threaded pin 19. A ring 20, the under side of which is provided with beveled gear-teeth 21, is arranged for rotation upon the disk 16, and oppositely-arranged inwardly-projecting lugs 22 are formed integral with the inner edge of this beveled gear-ring 20, said lugs engaging in oppositely-arranged notches formed in the edge of a plate 23, that is arranged to rotate with said ring 20 upon the disk 16. There is a centrally-arranged aperture in this plate 23, through which the lug 18 projects, and formed through said plate 23 and at equal distances apart is a plurality of apertures 24, that are so positioned as that they will during the rotation of said plate successively coincide with the aperture 17 and tubular seed-chute 14.

The seedbox 25 is in the form of a sheet-metal cylinder, and the lower edge of said seedbox rests directly upon the top of the beveled gear-ring 20. Rigidly fixed to the inner side of the lower end of said seedbox 25 is a tri-armed bracket 26, said arms projecting from a centrally-arranged base 27, through which is formed an aperture to receive the pin 19, and a nut is located upon said pin 19 and holds the base rigidly upon the lug 18. Two of the arms of this bracket 26 are, as previously stated, secured to the seedbox 25, while the third arm 28 extends vertically upward and has its upper end turned into a horizontal plane and extended to a point immediately above the aperture 17 previously mentioned. In the outer end of this outwardly-turned end portion is formed an aperture 29, and through the arm that is in alinement with said outwardly-turned end is formed an aperture 30, through which alined apertures operates a vertical rod 31, the lower end of which carries a ball 32, that normally engages in the apertures 24 through the plate 23.

Extending transversely between the rear ends of the runners 8 is a rock-shaft 33, which is arranged in suitable bearings 34, that are secured to the under sides of the frame 1, the ends 35 of said rock-shaft being turned downwardly immediately behind the tubular seed-chutes 14, and carried by the extreme lower ends of said downwardly-turned ends 35 are horizontally-arranged plates 36, that normally engage below the lower ends of the tubular seed-chutes 14 and cut off the passage therethrough. Adjustably located upon this shaft 33 is a downwardly and forwardly projecting arm 37, the forwardly-projecting portion of which is bifurcated to form the mating fingers 38, said fingers 38 being curved outwardly, as indicated by 39, Fig. 4, at a point adjacent where they join with the solid portion of the arm 37 to form a passage 40 between said fingers, which passage is much wider than the passage between the remaining portions of said fingers 38. This passage 40 is formed on an angle through the arm 37, the reason of which will be hereinafter specified.

Bolted to the under sides of the rear ends of the top bars 13 are downwardly-projecting brackets 41, which perform the function of stops to limit the rearward movement of the downwardly-turned ends 35 of the shaft 33.

Arranged for rotation in suitable bearings carried by the under side of the runner-frame 1 is a shaft 42, upon the ends of which are fixed beveled gear-pinions 43, that mesh with the beveled gear-rings 20, and loosely mounted upon said shaft 42 at a point in vertical alinement with the arm 37 is a pair of tripping-arms 44, the upper ends of which are curved outwardly. Between the lower ends of said arms 44 and rigidly carried by the shaft 42 is a ratchet-wheel 45, the same being provided with ratchet-teeth 46 and notches 47, which are arranged alternately. A gravity-pawl 48 is pivotally held between the arms 44 in such a position as to engage behind the teeth 46, which pawl is provided at one end outside one of the arms 44 with a weight 49. Bolted to the top of the tubular cross-bars 6 and 7 immediately to one side of the trip-arms 44 is a longitudinally-extending bar 50, and to said bar 50 is pivoted the forward end of a gravity-pawl 51, the rear end of which carries a laterally-projecting finger 52, that normally engages in the notches 47 of the ratchet-wheel 45, the extreme outer end of said arm 52 being provided with a suitable weight 53. Adjustably held upon the top of this bar 50 is a laterally-projecting finger 54, that performs the function of a stop to limit the forward movement of the trip-arms 44. Projecting laterally from a point near the rear end of the bar 50 is an arm 55, to the outer end of which is connected the rear end of a bar 56, that lies parallel with the bar 50, and in and between the forward ends of these parallel bars 50 and 56 is journaled a shaft 57, there being a grooved pulley 58 rotatably mounted upon said shaft between said bars 50 and 56. To the laterally-projecting arm 55 is secured the rear end of a retractile coil-spring 59, the forward end of which is secured to the trip-arms 44, the action of said coil-spring 59 being to return the trip-arms to their normal position after the same have been moved forwardly to their limit of movement.

Bolted to the under side of the center bar 9 is a laterally-projecting arm 60, upon the end of which is journaled a grooved pulley 61, and to the shaft of said pulley is pivotally connected a pair of forwardly-projecting arms 62, between the ends of which is journaled a second grooved pulley 63, and projecting forwardly from the shaft thereof is a pair of arms 64, between the forward ends of which is journaled a third grooved pulley 65, the same being provided with a suitable weight 66. These grooved pulleys 61, 63, and 65 are what is known as "idlers," and they are in alinement and occupy the space between the forward ends of the fingers 38 of the bifurcated arm 37 and the grooved pulley 58. Upon one end of the shaft upon which the pulley 58 is journaled is arranged a sheave or pulley 67, the purpose of which will be presently disclosed.

Carried by the tubular cross-bars 6 and 7, adjacent the center bar 9, is a longitudinally-extending rod 68, that is provided with a plurality of upwardly and downwardly projecting guide-rings 69, the same being in alinement with the sheave 67. A bracket 70 is bolted to the top of the tubular cross-bar 7, one end of which bracket is turned upwardly to receive a horizontally-arranged bolt 71, upon which is rotatably arranged a grooved wheel 72, and a pair of arms 73 is pivotally held upon said bolt 71, between the outer ends of which arms is rotatably arranged a grooved wheel 74. These grooved wheels perform the function of idlers and are directly in the rear of the upper ends of the trip-arms 44.

Fixed to and projecting inwardly from the left-hand side of the wheel-frame 2 is a pair of arms 75, the inner ends of which are provided with a vertically-arranged notched segment 76. A bar 77 extends between the lower ends of this segment 76, and in said bar 77 and in a bar 78, fixed to the side of the frame 2 between the ends of the arms 75, is journaled a shaft 79, the inner end of which terminates at a point midway between the sides of the frame 2 and is there provided with a longitudinally-extending tilting bar or lever 80, the forward end of this bar pivotally engaging a vertically-arranged arm 81, the ends of which project upwardly through the slots 12 in the spring-plates 10, its ends being provided with the laterally-projecting lugs 82, and the rear end of said bar 80 is provided with a foot-rest 83. The lower end of a hand-lever 84 is rigidly connected to the shaft 79, said hand-lever being provided with the usual latch that engages in the notches of the segments 76.

Carried by the spring-arm 85, that is bolted to the rear end of the wheel-frame 2, is a driver's seat 86, and pivoted to a bracket carried by the rear end of the segment 76 immediately in front of this driver's seat 86 is a bell-crank lever 87, the lower end of which is connected by a horizontally-arranged bar 88 with the downwardly-pending arm 89 of a transversely-arranged rock-shaft 90, which is arranged in suitable bearings upon the rear end of the wheel-frame 2, the outer ends of said rock-shaft 90 carrying curved plates 91, that perform the function of scrapers to engage the peripheries of the traction-wheels 5. A bracket 92 extends upwardly from the center of the bar 80, and journaled to the upper end thereof is a sheave 93, upon which sheave is wound a measure-line 94, the same being carried forward from the upwardly-projecting guide-rings 69, previously mentioned, around the sheave 67 and rearwardly from the downwardly-projecting guide-rings 69, and finally to a point adjacent the driver's seat, where it terminates and is provided with a weight 95.

The tubular shaft or axle 4, upon which the traction-wheels 5 are mounted, is arranged in suitable bearings carried by the wheel-frame 2, and said shaft or axle is composed of a tubular member 96, the right-hand half of which is reduced in diameter, which reduced portion is provided with a sleeve 97, that carries on its inner end an integral flange 98, the face of which is provided with ratchet-teeth. The left-hand traction-wheel 5 is rigidly carried upon the left-hand end of the shaft or axle 96, while the right-hand wheel is rigidly fixed to the end of the sleeve 97. Arranged to slide upon the inner end of the enlarged portion of the axle 96 is a sleeve 99, the inner end of which carries a flange 100, having ratchet-teeth adapted to engage between the ratchet-teeth of the flange 98. A disk 101 is formed integral with the sleeve 99, said disk having a curved face, which curved face is adapted to be engaged by an inclined face 102, formed on the under side of the bar 80. Formed integral with the outer end of the sleeve 99 is a pair of oppositely-arranged lugs 103, that are adapted to enter notches 104, formed in a sleeve 105, which is rigidly carried by the larger portion of the axle 96 between the sleeve 99 and the left-hand bearing of the axle 96. An expansive coil-spring 106 is located upon the sleeves 105 and 99 between this left-hand bearing and the curved-faced disk 101. The tendency of this coil-spring 106 is to throw the ratchet-face of the flange 100 into engagement with the ratchet-face of the flange 98. Loosely mounted upon the sleeve 97 to the right of the flange 98 is a narrow U-shaped frame 107, the same projecting forwardly, and journaled in suitable bearings carried by the forward end of said frame is a shaft 108, that carries a large traction-wheel 109, having a grooved periphery, which traction-wheel 109 is in direct alinement with the idlers 74 and 72 of the trip-arms 44. The forward end of this frame 107 is sustained by a curved arm 110, that projects forwardly from said frame 107 and is loosely connected to a downwardly-pending arm 111, that is carried by the transverse cross-bar 7, or it may be a continuation of the rear end of the bar 50. A chain 112, provided at suitable intervals with balls or enlarged links 113, passes around the grooved traction-wheel 109 between the idlers 74 and 72, from thence between the trip-arms 44, around the grooved pulley 58, beneath the idler 65, between the idlers 63 and 61, and between the fingers 38. An ordinary sprocket-wheel 114 is rigidly carried upon the shaft 108 to the right hand of the frame 107, and said sprocket-wheel 114 is connected by an ordinary sprocket-chain 115 with a sprocket-wheel 116, that is rigidly carried upon the sleeve 97 between the frame 107 and the right-hand portion of the frame 2.

The operation is as follows: As the planter is moved forwardly across the field with all of the parts in proper position, the grooved traction-wheel 109 rides directly upon the ground, and consequently rotates, and in so doing the chain 112 is caused to travel around said grooved traction-wheel 109 and over and between the idlers, as hereinbefore stated. Whenever one of the balls or enlarged links 113 engages against the rear sides of the arms 44, it will cause said arms to move forwardly in the direction indicated by the arrow in Fig. 7 until said arms assume a position as shown by dotted lines in said figure, during which movement the gravity-pawl 48, carried by said arms 44, will engage one of the teeth 46 of the ratchet-wheel 45 and partially rotate said ratchet-wheel, which in turn will partially rotate the shaft 42, and the beveled gear-pinions 43, carried by said shaft 42, being in mesh with the beveled gear-ring 20, said ring 20 will be partially rotated. Some of the seed within the seedbox 25 will of course pass into the recesses formed by the apertures 24, and said seed will be carried around in successive movements to a point beneath one of the arms of the bracket 26, and as a portion of said arm is formed to remove the excess seed from the recess that passes beneath said arm only the proper number of seeds will be carried to the point desired. Each successive movement of the seed-plate 23 will carry one of the apertures 24, filled with seed, to a point in alinement with the aperture 17 and passage through the seed-chute 14. Said seed will now discharge downwardly through said seed-chute 14 onto the cut-off plate 36, and the ball 32, which was previously elevated as it rode onto the face of the seed-plate 23, will gravitate into the aperture 24, that coincides with the aperture 17, and will thus cut off the passage from the seedbox into the seed-chute. This prevents any extra seeds from accidentally passing into the seed-chute. When the ball or enlarged link 113 has traveled around the pulley 58 and past the idlers 65, 63, and 61, it engages on top of the forwardly-projecting fingers 38, and as it continues in its travel it will ride rearwardly along the top edges of said fingers and at the same time will depress said fingers, which in turn imparts a slight movement to the arm 37, slightly rocks the shaft 33, and causes the plates 36 to move rearwardly away from the lower ends of the seed-chutes 14. Thus the seed is momentarily held at the lower end of the seed-chute 14, which allows all of the individual seeds to pass onto said plate 36, and then said seeds are all simultaneously allowed to discharge into the ground, and as the planter passes on said seeds will be covered by the traction-wheels 5. This action takes place as often as one of the balls or enlarged links 113 engages the tripping-arms 44 and the fingers 38. When the tripping-arms 44 start on their forward movement, the arm 52 is pushed out of the notch 47, in which it was engaged, and when said arms 44 have reached their forward limit of movement another notch 47 will have been brought into position where it can be engaged by the arm 52. When the ball or link 113 slips off from the upper ends of the arms 44, the retractile coil-spring 59 will instantly return said arms 44 to their normal positions, during which movement the arm 52 of the gravity-pawl will hold the ratchet-wheel 45 against any rearward movement, and when the arms 44 have reached their limit of movement the gravity-pawl 48 will drop behind the next adjacent tooth 46, which has been brought into position by the previous movement of said arms. When the planter has reached the end of the field and it is desired to turn around and start on the return trip across the field, it is essential that the dropping mechanism be caused to drop at the proper intervals to coincide with the row previously dropped in order that all of the rows will be straight. To accomplish this, I have provided the measure-line 94, and said measure-line must be specially prepared or provided with a pair of marks or colored spots, the distance between said marks or spots being approximately equal to the distance required to turn the corn-planter around. When the planter has reached the end of the field and just before turning the same, the driver and operator of the planter winds or unwinds the sheave 93 until the first mark or spot is in direct transverse alinement with the ball or enlarged link 113, that will next engage with the tripping-arms 44, the position of the mark or spot being clearly shown in Fig. 1. After doing this the driver removes the weight 95 from its resting-place and allows it to drop upon the ground, after which he manually engages the upper end of the hand-lever 84 and at the same time places his foot upon the rest 83, then successively bears down upon said rest and pulls the upper end of the hand-lever toward the rear end of the planter. This combined pull will tilt the bar 80 upon the shaft 79, depressing the rear end thereof and elevating the forward end, and when the forward end is elevated the bar 81 will pull upwardly on the lower one of the spring-plates 10, and thus elevate the entire front of the machine and the runners carried thereby. When said runners move upwardly out of the ground, the curved arm 110 is slightly elevated, and consequently the grooved traction-wheel 109 is elevated from the ground, so that when the planter is turned said grooved traction-wheel will not rotate and none of the parts carried by the runner-frame will operate. When the rear end of the bar 80 is depressed, the beveled face 102 on the under side thereof will bear against the curved face of the disk 101 and the sleeve 99 and parts carried thereby will be moved to the left, as indicated by dotted lines in Fig. 3, which movement will compress the coil-spring 106 and separate the parts of the clutch formed by the flanges 98 and 100, that are provided with the engaging faces. This action throws the sprocket-wheel 116 out of operation, and the planter may be turned without any operation of the dropping mechanism. When the hand-lever 84 is pulled rearwardly, it may be locked by the usual operation of the latch thereon engaging with one of the notches of the segment 76, and when so locked the entire runner-frame of the machine is held in an elevated position. The planter, with the runner-frame and runners in an elevated position, is now turned, and in so doing the measure-line 94 will unwind, as the weight 95 remains at the point where it was first dropped. When the planter has been completely turned around, it is moved forwardly until the second one of the marks or spots appears upon said measure-line directly opposite the ball or enlarged link 113, and this will insure the dropping of the new row in proper alinement with the rows previously planted. After the planter has been turned the driver rewinds the measure-line upon the sheave 93, loosens the latch of the hand-lever 84, and by so doing allows the runner-frame and mechanism carried thereby to lower to its working position. This movement causes the bar 80 to swing into its normal position, which releases the disk 101 and allows the sleeve 99 to move forwardly, which movement necessarily brings together the two parts of the clutch upon the axle or tubular shaft 4. This brings all of the parts of the planter into operative position, and the new row is planted as the planter moves across the field. Whenever desired, the driver places his foot upon the rear end of the bell-crank lever 87 and moves the same downwardly, which movement causes the scrapers 91 to engage the peripheries of the traction-wheels 5, thus cleaning the same.

A check-rower of my improved construction is simple, strong, and durable, is easily operated, and very efficient in use.

I claim—

1. A check-rower, constructed with a runner-frame, runners carried thereby, a wheel-frame, traction-wheels supporting said wheel-frame, which runner-frame and wheel-frame are pivotally connected, a centrally-located longitudinally-extending bar in the runner-frame, a pair of spring-plates extending rearwardly from the end of said bar, which plates are slotted, a tilting-bar carried by the wheel-frame, the forward end of which tilting-bar pivotally engages the slotted ends of the spring-plates, seed-dropping mechanism carried by the runner-frame, a grooved traction-wheel rotatably carried by the wheel-frame, connections from said traction-wheel to the seed-dropping mechanisms, means whereby the rotary motion of the traction-wheels is imparted to the grooved traction-wheel, and means whereby the seed-dropping mechanism is thrown out of operation when the tilting-bar is operated to raise the runner-frame, substantially as specified.

2. A check-rower, constructed with a runner-frame, runners carried thereby, a wheel-frame, traction-wheels supporting said wheel-frame, which runner-frame and wheel-frame are pivotally connected, seed-dropping mechanism carried by the runner-frame and operated from the wheel-frame, and a measure-line carried by the united frames upon which tape-measure is suitably located indicating-marks, and a weight secured to the rear end of said tape-measure, substantially as specified.

3. In a check-rower, a wheel-frame, a shaft carried thereby, traction-wheels arranged upon the ends of said shaft, a runner-frame pivotally connected to said wheel-frame, runners carried by said runner-frame, seedboxes arranged upon said runners, seed-discharging mechanism arranged in the bottom of said seedboxes, a shaft rotatably arranged and extending between said seedboxes, pinions carried by the end of said shaft for operating said discharging mechanism, a ratchet-wheel rigidly carried by said shaft, a pair of arms loosely located upon said shaft, a gravity-pawl carried between said arms for engaging the teeth of said wheel, a gravity-pawl for engaging the notches of said wheel, and means operated from the shaft of the wheel-frame for tripping the arms, substantially as specified.

4. In a check-rower, a tubular shaft, wheels mounted on the ends thereof, a frame carried by said shaft, a runner-frame pivotally connected to the wheel-frame, runners carried by the runner-frame, tubular seed-chutes integral with said runners, seedboxes carried upon said runners, means located in the bottom of the seedboxes for discharging a certain amount of seed into the tubular seed-chutes, means whereby said seed-discharging mechanism is operated, a rock-shaft arranged between the runners behind the tubular seed-chutes, the ends of which rock-shaft are turned downwardly behind said seed-chutes, plates carried by the lower ends of said downwardly-turned ends for normally closing the lower ends of the tubular seed-chutes, and an arm carried by the shaft, which arm extends downwardly and forwardly, the forwardly-bent portion of which is bifurcated and the fingers formed by the bifurcation being bent outwardly to form an enlarged passage through the arm, substantially as specified.

In testimony whereof I affix my signature in presence of two witnesses.

ARTHUR GREER.

Witnesses:
RUSSELL MONROE,
F. M. JOSLYN.